Figure 1:
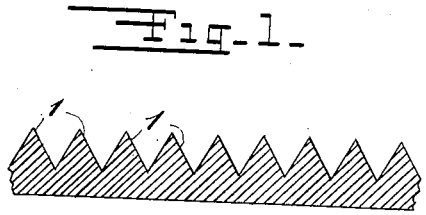

No. 747,961. PATENTED DEC. 29, 1903.
P. G. FRAUENFELDER, DEC'D.
L. R. E. FRAUENFELDER, EXECUTRIX.
ART OF MAKING PHOTOGRAPHIC IMAGES.
APPLICATION FILED OCT. 13, 1900.

NO MODEL.

WITNESSES:
John O. Gempler
John A. Clark

INVENTOR
Paul George Frauenfelder
BY
Kenyon & Kenyon
ATTORNEYS

No. 747,961. Patented December 29, 1903.

UNITED STATES PATENT OFFICE.

PAUL GEORGE FRAUENFELDER, OF NEW YORK, N. Y.; LENA ROSA EMMA FRAUENFELDER EXECUTRIX OF SAID PAUL GEORGE FRAUENFELDER, DECEASED.

ART OF MAKING PHOTOGRAPHIC IMAGES.

SPECIFICATION forming part of Letters Patent No. 747,961, dated December 29, 1903.

Application filed October 13, 1900. Serial No. 32,947. (No model.)

*To all whom it may concern:*

Be it known that I, PAUL GEORGE FRAUENFELDER, a citizen of the Republic of Switzerland, and a resident of the city, county, and State of New York, have invented certain new and useful Improvements in the Art of Making Photographic Images, of which the following is a specification.

My invention relates to photography, and especially to methods for making negatives. Its object is to make negatives of an object which shall be formed by one or more or all of the constituent spectral colors which enter into or constitute the light proceeding from such object and to do this in a simple, effective, and inexpensive manner and without the employment of devices for filtering or absorbing one or more of the colors or for treating the sensitized surface to make it insensible to rays of light of a certain color or colors, all of which devices have heretofore proved unsatisfactory.

My invention consists in the improved method herein shown and described.

Many efforts have heretofore been made in color-photography to separate one or more of the colors entering into or constituting the light proceeding from an object from another color or colors for purposes of photography; but this has generally been attempted by "filtering" or "absorbing" the light, as it is called, or by placing colored liquids or media between the object to be photographed and the sensitized surface or by treating the sensitized surface in some way, so as to cause it to refuse to be acted upon by one or more of the colors. These devices have all, as far as I am aware, been unsatisfactory in operation.

I accomplish my object by separately dispersing the separate rays proceeding from the object to be photographed, each ray into its constituent spectral colors, and expose the sensitized surface to one or more of such color-rays. By segregating the rays and dispersing each ray into its spectral colors I am enabled to cause an image to be formed upon the sensitized surface by the action of one or more or all of the constituent colors which enter into the light proceeding from the object.

In the drawings accompanying this specification and forming a part hereof, and in which similar reference characters in the different figures represent corresponding parts, I have shown one means or apparatus for carrying out my improved process, and I have shown the apparatus which I prefer to use for that purpose.

Referring now to the specific apparatus shown in the drawings, Figures 1 to 8, inclusive, are vertical cross-sections through apparatus capable of use in my improved process.

Figure 2:
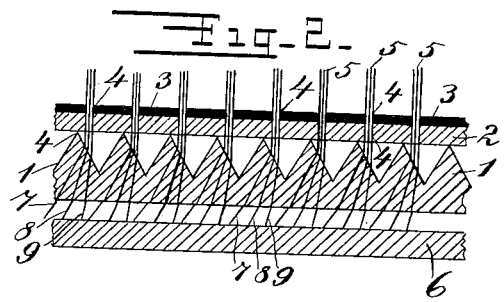

1 1 form a series of prismatic surfaces for segregating the rays proceeding from the object to be photographed and dispersing the separated rays each into its constituent spectral colors. The prisms shown in the sketch are preferably made very small and close together, those shown in the drawings being magnified for a clearer understanding of the invention. While the series of prisms 1 can be used for segregating as well as dispersing the separated rays, I prefer to use a separate device for segregating the rays before they are dispersed. For this purpose I preferably use a segregating-screen 2. (Shown in Fig. 2.) As shown, it is made opaque by means of an opaque coating 3; but it is provided with parallel transparent lines 4 for permitting the passage of the parallel lines of light 5 5, so that these lines of light may proceed to the series of prisms 1, which, as shown in Fig. 2, are arranged beneath screen 2. The prisms and screen are arranged so that there shall be one prism for each transparent line upon the screen; but two or more transparent lines corresponding to each prism can be used when a very fine segregation of rays is desired. 6 represents the sensitized surface or plate.

The parallel rays of light 5 proceeding from the object to be photographed pass through the transparent lines or openings 4 and fall upon one side only of the prisms, each of which prisms disperses the separate ray of light falling upon it into its constituent spectral colors, and these in lines 7, 8, and 9 are represented as falling separately upon sensitized plate 6. The number of colors would ordinarily exceed more than three, but I have represented three only for the sake of convenience, the three standing, respectively, for violet 7, green 8, and red 9. The sensitized surface after being exposed is of course developed in any suitable manner.

By the use of segregating-screen 2 the light from only one portion of the surface of the object falls upon each prism, and the different rays of light fall upon the corresponding sides of the different prisms. All these separate rays of light are thus resolved into their constituent spectral colors, and these colors fall upon their proper places on the sensitized surface. There is no general diffusion of the light of any ray over the whole of the sensitized surface. The transparent lines are preferably arranged at regular intervals from one another, so a series of rays proceeding from the object can be first photographed, and by either moving the apparatus or object and the sensitized plate the proper distance relatively to one another another series of contiguous rays proceeding from the object may also be photographed in colors upon the proper place upon the sensitized plate, and thus the entire surface of the object may be similarly photographed. By these means an exceedingly fine segregation of rays is possible. If, for instance, the screen contains fifty prisms to the inch and the opening 4, Fig. 2, is one four-hundred-and-fiftieths of an inch, I can make one exposure which will cover, allowing for the dispersion, one one-hundred-and-fiftieth of an inch of the sensitive surface behind each prism. By shifting the apparatus one one-hundred-and-fiftieth of an inch another exposure can be made and subsequently another one. Thus by the use of a prism of one-fiftieth of an inch and a very small opening in the segregating-screen a segregation to one one-hundred-and-fiftieth of an inch is possible. This is very important where it is found difficult to construct a prismatic screen of extreme fineness.

Figure 3:
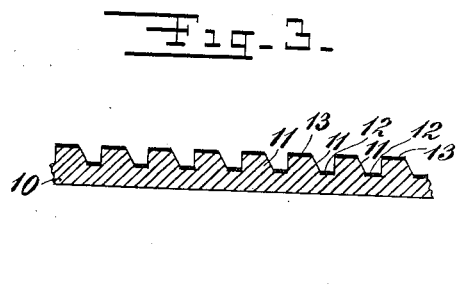
Figure 4:
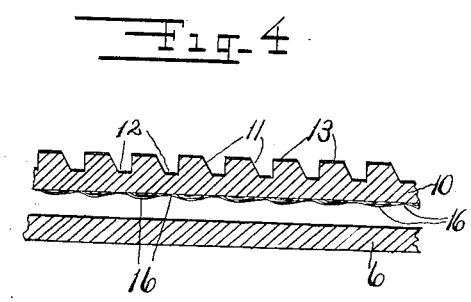

In Figs. 3 and 4 I have shown a modified form of my apparatus in which the segregating-screen and series of prisms are made integral or in which the prisms are made with but one operative face. 10 represents a plate of glass, for example, with its upper surface cut away, as shown, to form prism-surfaces 11 11 and flat surfaces 12 12 and 13 13. The flat surfaces 12 12 and 13 13 are covered, as shown, by any suitable material to make them opaque. The operation of this method is exactly the same as that shown in Figs. 1 and 2, the sensitized plate being, however, omitted from Fig. 3. Many other modifications may be made in the prisms.

Figure 5:
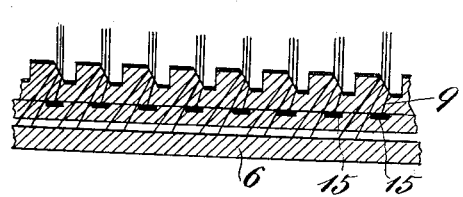

It is sometimes desired to cut off the dispersed rays of light of one or more of the colors, and for this purpose I preferably use an interference-screen 14, adapted to cut off the dispersed rays of one or more colors and to permit the rays not cut off to pass to the sensitized surface and form an image there. As shown, interference-screen 14 is provided with parallel opaque lines 15, formed of any suitable opaque material and preferably arranged at regular intervals from one another. Screen 14 is arranged relatively to the series of prisms, so that the opaque lines will cut off the dispersed rays of one or more colors, as desired. In Fig. 5 the opaque lines 15 are shown as narrow and as cutting off only the red rays 9, whereas in Fig. 6 they are shown broader and as cutting off red rays 9 and green rays 8, permitting only violet rays 7 to pass to plate 6. Plate 14 may, if desired, be made movable relatively to the prisms and the sensitized plate in order to cut off different colors. This form is represented in Figs. 5 and 6.

Figure 6:
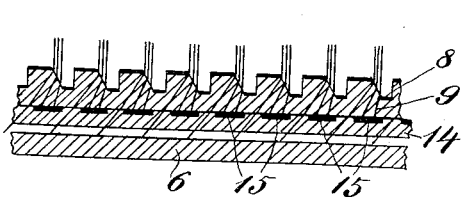
Figure 7:
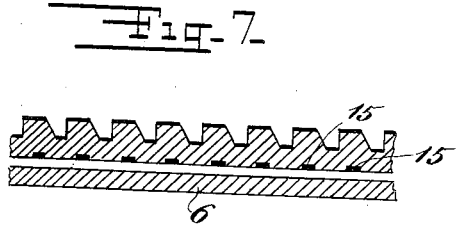
Figure 8:
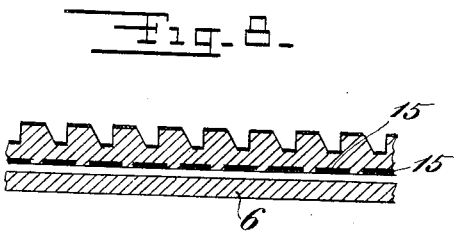

In Figs. 7 and 8 I have shown a modified form in which the interference-screen 14 of Fig. 6 is, in effect, made integral with the prism-plate, and here the opaque lines 15 are made, as shown, in the under side of the prism-plate itself. When these are used, a different prism-plate must necessarily be employed for each different color or colors that are to be cut off. By cutting off some of the color-rays, as described here, the resulting negatives would represent only the lines of light which acted upon the sensitive plate. In other words, the image would be cut up in straight parallel lines. For certain work—for instance, when the negatives are to be used for making printing-plates—this result is very desirable; but when it is desired to have a complete image all over the plate it will only be necessary to move the apparatus laterally the width of the opaque line 15, which operation will allow first one series of rays proceeding from the object to pass on parts of the sensitive plate and then the remaining series of rays to pass on the uncovered parts of the sensitive plate. Thus the entire surface of the object will be transferred on the entire surface of the sensitive plate.

It is well known that the different-colored rays unevenly affect a sensitized surface, some color-rays acting quicker than others. In order to avoid this defect and to make the action of the different color-rays as even as possible, I preferably use an additional sensitized surface, which I preferably obtain by coating the back or flat surface of the prismatic screen 10, Fig. 4, with a sensitive or sensitized emulsion or film or other suitable preparation, which I preliminarily expose to the action of the dispersed colored rays proceeding from a white light, developing such surface in any suitable manner. The result is a film on the back of the prismatic screen with lines alternating in strength exactly according to the actinic power of the different color-rays. In using such a screen the action of the rays subsequently passing through it is thus regulated in an entirely automatic and correct way. In Fig. 4 I have shown an apparatus for use for this purpose. The plate 10 is for this purpose coated on its under surface with any suitable sensitized film. The rays of white light are passed through the prisms 11, fall upon the film and act upon it, one color affecting it differently from another. I then develop the film thus made. The film thus produced is illustrated at 16 in Fig. 4 and is thicker in some places than in others, indicating more or less density as it has been unevenly affected by the various colors that have fallen upon it. The sensitized surface 6 that is to become the finished negative is then placed below the film 16 and the light from the object to be photographed is passed through prisms 11 and then through film 16, falling upon the sensitized surface 6. The colors which have the greatest effect upon the sensitized surface are thus caused to pass through the thicker parts of the film 16, and their power for affecting sensitized surface 6 is somewhat diminished, whereas the colors which produce a less effect upon a sensitized surface pass through the thinner parts of film 16 and are not correspondingly diminished in energy. The resulting film upon sensitized surface 6 is thereby made more nearly even or orthochromatic in all its parts. Such a screen is preferably used when all colors are desired on one and the same plate. They will all be represented by lines alternately representing the colors of the spectrum, as contained in the rays proceeding from the object being photographed.

In the form shown in Fig. 4 the additional sensitized film has for convenience been placed directly upon the lower surface of plate 10. It is not essential, however, that it be made a part of plate 10 as long as its position relative to the prisms is accurately maintained as it was when the exposure to the white light was made.

Modifications may of course be made in the apparatus or form of apparatus shown and described herein without departing from my invention.

By means of my improvement negatives formed by one or more of the colors constituting the light proceeding from an object can be easily, effectively, and inexpensively made. Such negatives may be used in any manner or for any purpose for which negatives can be employed. For example, they may be used in preparing printing-plates for one or more colors or for making lantern-slides, colored photographs, or for other purposes. Their use, however, is not limited to the specific purposes above enumerated.

What I claim as new, and desire to secure by Letters Patent, is—

1. The method of forming negatives which consists in separately dispersing the separate rays proceeding from an object to be photographed each into its constituent spectral colors, causing the rays of the different groups of spectral colors thus formed to fall simultaneously upon a sensitized surface and in the same relative order in which the rays proceeded from the object being photographed and developing such surface in any suitable manner.

2. The method of forming negatives which consists in segregating the rays proceeding from the object to be photographed, dispersing the separated rays each into its spectral colors, causing the rays of the different groups of spectral colors thus formed to fall simultaneously upon a sensitized surface and in the same relative order in which the rays proceeded from the object being photographed and developing such surface in any suitable manner.

3. The method of forming negatives which consists in segregating from one another and from the other rays, a series of the rays proceeding from the object to be photographed, the rays of said series being arranged at regular intervals from one another, dispersing the separated rays of the series each into its spectral colors, causing the rays of the different groups of spectral colors thus formed to fall simultaneously upon a sensitized surface and in the same relative order in which the rays proceeded from the object being photographed, segregating from one another and from the other rays another and contiguous series of the rays proceeding from the object to be photographed, the rays of said series being similarly arranged at regular intervals from one another, dispersing the separated rays of the series each into its spectral colors, causing the rays of the said different groups of spectral colors thus formed to fall simultaneously on the said sensitized surface and in the same relative order in which the rays proceeded from the said object, the rays of each couple of groups, one in one series and the other in the other, dispersed from contiguous rays proceeding from the object to be photographed, falling upon the sensitized surface alongside of each other and developing such surface in any suitable manner, whereby an image may be found upon the sensitized surface by the dispersed rays of colored light proceeding from all parts of the object being photographed.

4. The method of forming negatives which consists in separately dispersing the separate rays proceeding from an object to be photographed each into its constituent spectral colors, cutting off the dispersed rays of one or more colors, causing the rays, not cut off, of the different groups of spectral colors thus formed to fall simultaneously upon a sensitized surface and in the same relative order in which such rays proceeded from the object being photographed and developing such surface in any suitable manner, whereby an image may be formed upon the sensitized surface by all the dispersed rays of colored light except those cut off.

5. The method of forming negatives which consists in segregating from one another and from the other rays, a series of the rays proceeding from the object to be photographed, the rays of said series being arranged at regular intervals from one another, dispersing the separated rays of the series each into its spectral colors, cutting off the dispersed rays of one or more colors, causing the rays, not cut off, of the different groups of spectral colors thus formed to fall simultaneously upon a sensitized surface and in the same relative order in which said rays proceeded from the object being photographed, segregating from one another and from the other rays another and contiguous series of the rays proceeding from the object to be photographed, the rays of said series being similarly arranged at regular intervals from one another, dispersing the separated rays of the series each into its spectral colors, cutting off the dispersed rays of one or more colors, causing the rays, not cut off, of the said different groups of spectral colors thus formed to fall simultaneously on the said sensitized surface and in the same relative order in which the rays proceeded from the said object, the rays of each couple of groups thus falling upon the sensitized surface, one in one series and the other in the other series, dispersed from contiguous rays proceeding from the object to be photographed, falling upon the sensitized surface alongside of each other, and developing such surface in any suitable manner, whereby an image may be formed upon the sensitized surface by all the dispersed rays of colored light, except those cut off.

6. The method of forming negatives which consists in separately dispersing the separate rays proceeding from an object to be photographed each into its constituent spectral colors, passing the rays through a surface or medium of different density, proportionate to the actinic action of the different color-rays, and causing the rays of the different groups of spectral colors thus formed to fall simultaneously upon a sensitized surface and in the same relative order in which the rays proceeded from the object to be photographed and developing it in any suitable manner.

7. The method of forming negatives which consists in segregating the rays proceeding from the object to be photographed, dispersing the separated rays each into its spectral colors, passing the rays through a surface or medium of different density, proportionate to the actinic action of the different color-rays, and causing the rays of the different groups of spectral colors thus formed to fall simultaneously upon a sensitized surface and in the same relative order in which the rays proceeded from the object to be photographed and developing it in any suitable manner.

8. The method of forming photographic images, which method consists in separately dispersing the rays proceeding from the object to be photographed into its constituent spectral colors and causing the rays constituting a set of corresponding elements of the different groups of spectral colors to fall simultaneously upon a sensitive surface and developing said sensitive surface in a suitable manner.

In testimony whereof I have signed my name to this specification in the presence of two subscribing witnesses.

PAUL GEORGE FRAUENFELDER.

Witnesses:
JOSEPH P. KNAPL,
GEO. H. BARNES.